United States Patent
Li

(10) Patent No.: US 7,633,860 B2
(45) Date of Patent: Dec. 15, 2009

(54) METHOD FOR FAST REROUTING

(75) Inventor: Zhenbin Li, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 420 days.

(21) Appl. No.: 11/653,747

(22) Filed: Jan. 16, 2007

(65) Prior Publication Data
US 2007/0189265 A1    Aug. 16, 2007

Related U.S. Application Data

(63) Continuation of application No. PCT/CN2005/001941, filed on Nov. 17, 2005.

(30) Foreign Application Priority Data
Nov. 17, 2004    (CN)    ................... 2004 1 0090896

(51) Int. Cl.
H04L 12/26    (2006.01)
H04L 12/28    (2006.01)
G06F 15/173    (2006.01)

(52) U.S. Cl. .................. 370/225; 370/248; 370/351; 709/238

(58) Field of Classification Search ......... 370/216–228, 370/241–252, 351–352, 389, 392; 709/238–244
See application file for complete search history.

(56) References Cited

U.S. PATENT DOCUMENTS

| 6,327,242 B1 * | 12/2001 | Amicangioli et al. ....... 370/216 |
| 6,535,509 B2 * | 3/2003 | Amicangioli ............... 370/389 |
| 7,237,036 B2 * | 6/2007 | Boucher et al. ............ 709/245 |
| 7,333,425 B2 * | 2/2008 | Huck et al. ................. 370/217 |
| 7,388,828 B2 * | 6/2008 | Nakash ....................... 370/218 |
| 7,590,131 B2 * | 9/2009 | Ansorge et al. ............. 370/409 |

FOREIGN PATENT DOCUMENTS

| CN | 1469600 | 1/2004 |
| WO | WO 03/060745 | 7/2003 |
| WO | WO 03/062947 | 7/2003 |
| WO | WO 03/107606 | 12/2003 |

* cited by examiner

Primary Examiner—Tri H Phan
(74) Attorney, Agent, or Firm—Darby & Darby P.C.

(57) ABSTRACT

A method for fast rerouting, wherein, in a router, a fast rerouting flag and bypass path information is set for forward information corresponding to a label switch path of an incoming interface board, the method including: receiving a packet, by an incoming interface of the router, determining whether the fast rerouting flag, set for the forward information corresponding to the packet, is valid; if the fast rerouting flag is invalid, forwarding the packet according to the forward information corresponding to the packet; if the fast rerouting flag is valid, forwarding the packet according to the bypass path information set for the forward information which the packet corresponds to. Thus, not only the problem of inter-board transparent transmission can be avoided, which is introduced when the NHLFE of the outgoing-interface board being extended to realize fast rerouting, but also the fast rerouting after the interface board being plugged out can be realized.

12 Claims, 3 Drawing Sheets

METHOD FOR FAST REROUTING

CLAIM OF PRIORITY

This application is a continuation, and claims priority under 35 U.S.C. § 365, of International Application No. PCT/CN2005/001941, filed on Nov. 17, 2005, and claims the benefit of priority of Chinese Patent Application No. CN 200410090896.3, filed Nov. 17, 2004. The International Application was published in Chinese on May 26, 2006 as WO2006/053497.

FIELD OF THE INVENTION

The invention relates to the network communication technology, and more particularly, to a method for fast rerouting.

BACKGROUND OF THE INVENTION

Fast rerouting is a mechanism for protecting a Constrain-based Routing Label Switch Path (CRLSP), which protects the basic CRLSP from being influenced by link failures through providing a local backup path. To protect the CRLSP, first, the primary paths of the CRLSP are enabled to have a fast rerouting property through configuration, and if a router detects a failure in a link to be protected, services can be switched from the link with the failure to a backup path, thereby realizing the protection operation.

As shown in FIG. 1, assume that there is a basic link A-B-C-D-E. Link A-G-C is used to protect node B and node B's related links, link B-G-D is used to protect node C and node C's related links, link C-F-E is for protecting node D and the related links thereof, and link D-F-E is used to protect link D-E. For instance, when node C goes wrong, node B switches the network service flow to link B-G-D so that node C can be protected.

There are two methods for implementing fast rerouting in the prior art: bypass and detour. The bypass method for implementing fast rerouting is generally used at present. According to the bypass method, a pre-setup bypass LSP with the fast rerouting property is used to protect multiple LSPs passing the bypass LSP. When a protected link goes wrong, the service on a primary LSP is switched to the bypass LSP and arrives at the next-hop router through the bypass LSP, thus the purpose of protection can be achieved.

There are three kinds of common failures in the present network, including:

1. an interface of a local router being DOWN;
2. a link or node failure being discovered by signaling; and
3. an interface board of a local router going wrong or being invalid.

The conventional technology mainly deals with the first two kinds of failures. If a router detects that there is a failure in an interface or a peer router, service flow is switched to a Bypass tunnel to avoid flow loss. This process is as follows: adding the information of a bypass path to a Next-hop Label Forward Entry (NHLFE) of an outgoing-interface board of the router; when a packet arrives at the outgoing-interface board, sending the service flow being to the interface board of the bypass path according to the bypass path information in the NHLFE if there is an interface failure, and sending out the service flow through an interface of the bypass path. Taking a distributed router for an instance, if a physical interface is DOWN, the interface board is able to find out a CRLSP failure directly and modify the forward information of the NHLFE, thereby switching to the bypass path; and it is needed to inform the interface board to modify forwarding information of the NHLFE if the CRLSP failure is discovered based on the signaling protocol so as to switch to the bypass path. Therefore, by extending the forward entry information of the NHLFE to realize fast rerouting, the first and the second kinds of network failures can be avoided.

However, in the implementation method in the prior art, since the router can determine that packet need to be forwarded by fast rerouting only if the packet has arrived at the outgoing-interface board, the packet has to be transmitted from an incoming-interface board to an outgoing-interface board, and then be forwarded to the interface board of the bypass path from the outgoing-interface board. That is, the transparent transmission between interface boards is required, thus the transmission efficiency is reduced.

Besides, the implementation method can not resolve the problem of flow loss in the third failure well, the reason is that, the NHLFE saved in the interface board will be lost completely when the interface board goes wrong. In a common processing method, the CRLSP is deleted directly and a new one is reset, which leads to flow loss because of the delete and re-setup of the CRLSP. And if the path meeting the condition can not be found, a new CRLSP can not be established, and may further lead to flow interruption.

SUMMARY

An embodiment of the present invention provides a method for fast rerouting so as to solve the problems of flow loss and low transmission efficiency when a router interface/board goes wrong, wherein, in a router, a fast rerouting flag and bypass path information is set for forward information corresponding to a label switch path of an incoming interface board, the method including:

receiving a packet, by an incoming interface of the router, determining whether the fast rerouting flag, set for the forward information corresponding to the packet, is valid; if the fast rerouting flag is invalid, forwarding the packet according to the forward information corresponding to the packet; if the fast rerouting flag is valid, forwarding the packet according to the bypass path information set for the forward information which the packet corresponds to.

In the above solution, the fast rerouting flag and the bypass path information being set for the forward information corresponding to the label switch path, may include: if a forward path has a failure, setting the fast rerouting flag as valid; otherwise, setting the fast rerouting flag as invalid.

In the above solution, setting the fast rerouting flag as valid if the forward path has a failure may include: if the router detects a failure in an interface or a peer router, reporting the failure; and if a link related to the reported failure has a bypass protection function, enquiring a constrain-based routing label switch path corresponding to the link and setting the valid fast rerouting flag and the bypass path information for the forward information corresponding to the constrain-based routing label switch path.

In the above solution, setting the fast rerouting flag as valid if the label switch path has a failure may include: if an outgoing interface on an interface board has a failure and if a link related to the failure has a bypass protection function, setting, on the outgoing-interface board, the valid fast rerouting flag and the bypass path information for the forward information corresponding to the constrain-based routing label switch path of the link, and setting the valid fast rerouting flag and the bypass path information for the forward information corresponding to the constrain-based routing label switch path of the link on an incoming-interface on the interface board; and forwarding the packet according to a next-hop label forward entry saved on the outgoing-interface board.

In the above solution, setting the fast rerouting flag as valid if the forward path has a failure may include: if the router is an ingress node of a constrain-based routing label switch path, setting the fast rerouting flag for the forward information in a tunnel interface as valid, setting TOKEN information of a bypass path as pointing to a next-hop label forward entry information of the bypass path, the bypass path corresponding to the forward information in the tunnel interface; and if the router is a transit node of the constrain-based routing label switch path, setting the fast rerouting flag for the forward information in incoming-label mapping as valid, setting the TOKEN information of a bypass path as pointing to a next-hop label forward entry information of the bypass path, the bypass path corresponding to the forward information in the incoming-label mapping.

According to an embodiment of this invention, the forward information of the tunnel interface and that of the Incoming-Label Mapping (ILM) table entry is added. If fast rerouting is needed, the incoming-interface board directly sends information to an outgoing-interface board of a bypass path according to the forward information. Thus, not only the inter-board transparent transmission problem can be avoided which is introduced when the fast rerouting is realized by adopting the extended NHLFE of the outgoing-interface, but also the fast rerouting can be realized in the case of an interface board being plugged out.

DETAILED DESCRIPTION OF PREFERRED EMBODIMENTS

Figure 1:
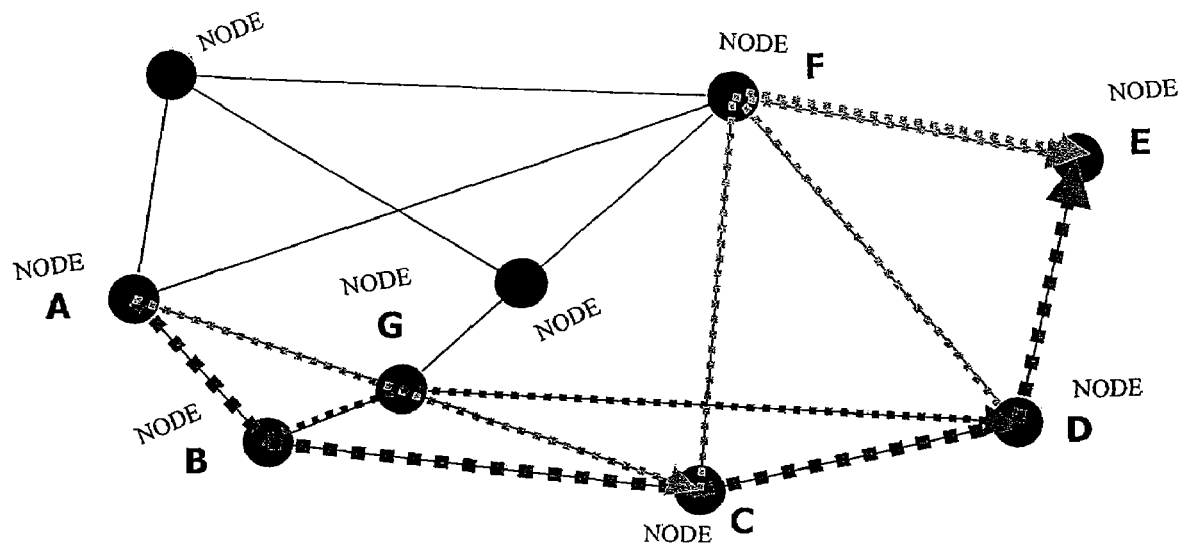
FIG. 1 is illustrating a schematic drawing of the fast rerouting technology in the prior art.

For people ordinary skilled in the field to understand and implement the invention, the embodiments of the invention are given as follows with reference to the accompanying drawings.

The LSP forward entries of the MPLS are extended to implement fast rerouting of the invention.

First of all, a CRLSP of an ingress node corresponds to a Multi-Protocol Label Switching (MPLS) Traffic Engineering (TE) tunnel interface which has interface common information similar to that of some practical physical interfaces like an Ethernet port or a serial port etc. Besides, the forward information of the tunnel interface also includes TOKEN information pointing to the NHLFE information of the CRLSP corresponding to the tunnel interface. When a packet arrives, the packet is sent to a corresponding interface board based on the TOKEN information, then the outgoing-label information is pushed in the packet according to the NHLFE information, and then the packet is sent to a downstream node.

According to an embodiment of the invention, to support fast rerouting, it is necessary to extend the forward information of the tunnel interface, and the extension of the forward information of the tunnel interface is as follows:

1) Set a fast rerouting flag, indicating whether the corresponding packet needs to be forwarded by fast rerouting;

2) Set TOKEN information of a bypass path, which points to the NHLFE information of the bypass path.

Secondly, the CRLSP of a transit node needs to use an ILM forward entry, the information of the ILM forward entry mainly includes: an incoming interface, an incoming label, and TOKEN information pointing to the NHLFE information of the CRLSP. If an MPLS packet arrives, the corresponding ILM entry can be obtained by using the label of the MPLS packet as an index, then the MPLS packet can be sent to an outgoing interface according to the TOKEN information included in the ILM entry, where the incoming label is swapped according to the NHLFE information, and the MPLS packet can be sent to a downstream node.

According to an embodiment of the invention, to support fast rerouting, it is necessary to extend the forward information of the ILM forward entry:

1) Set a fast rerouting flag, indicating whether the corresponding packet needs to be forwarded by fast rerouting;

2) Set TOKEN information of a bypass path, which points to the NHLFE information of the bypass path.

When a packet arrives at an incoming-interface board of a node, the node determines whether the fast rerouting flag of the forward information corresponding to the packet is valid. If it is invalid, it means that the corresponding packet doesn't need to be forwarded by fast rerouting, and then the packet will be sent to the corresponding outgoing-interface board according to the TOKEN information of the packet, where the outgoing-label information is pushed in the packet according to the NHLFE information, and then the packet will be sent to a downstream node. Otherwise, the packet will be sent to the corresponding outgoing-interface board according to the TOKEN information of the bypass path, where the outgoing-label information is pushed in the packet according to the NHLFE information of the bypass path, and then the packet will be sent to a downstream node. Herein, a node refers to a router.

Figure 2:
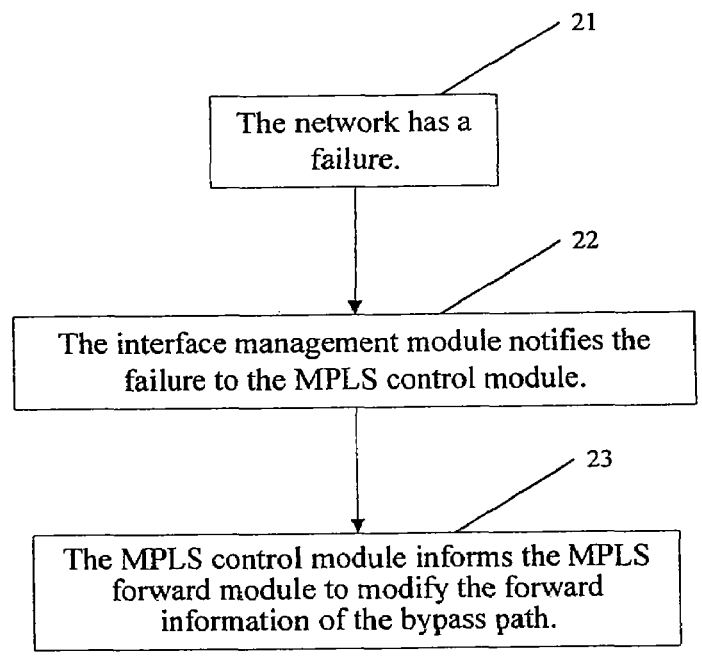
FIG. 2 is illustrating a flow chart of the fast rerouting in the case of a network going wrong according to an embodiment of the invention.

As shown in FIG. 2, in Step 21, if a router detects a failure in an outgoing interface or in a peer router, an interface management module will report the failure to multi-protocol label switching control modules (in Step 22). In Step 23, if there are links related with the failure, i.e., the link with the failure has been configured with a bypass protection function, the multi-protocol label switching control module queries a CRLSP corresponding to the link with the failure, and informs a multi-protocol label switching (MPLS) forward module to modify the forward information of the bypass path corresponding to the CRLSP.

For instance, when an interface board is invalid, e.g., the interface board is plugged out, the interface management module reports a message of a plug-out event corresponding to the interface to the MPLS control module. After receiving the plug-out event message, if a link corresponding to the interface board has a bypass path protection function, the MPLS control module queries the CRLSP corresponding to the link, and notifies the MPLS forward module of the interface board that the extended forward entries should be modified. For an ingress node, it is necessary to set the extended forward information of a tunnel interface, i.e., set the fast rerouting flag as valid, and set the TOKEN information of the bypass path as pointing to the NHLFE of the bypass path. For a transit node, it is necessary to set the extended forward information of an ILM, i.e., set the fast rerouting flag as valid, and set the TOKEN information of the bypass path as pointing to the NHLFE of the bypass path.

Besides, this invention can also be applied in the cases of the interface being DOWN or the link/node failure being discovered by signaling. In such cases, the interface management module reports the corresponding interface failure event to the MPLS control module, and then, instead of notifying the interface board that the NHLFE forward information should be modified, the MPLS control module directly modifies the forward information of the tunnel interface or that of the ILM.

In the case of the interface being DOWN, according to an embodiment of the invention, as reporting the information to the main control board, the interface board can also perform fast rerouting directly through the NHLFE forward information of the outgoing-interface board. Thus, if detecting the interface DOWN information, the outgoing-interface board directly switches flow immediately, thereby reducing data loss.

After the extension of the MPLS forward information, the corresponding forward procedure should also be modified appropriately.

Figure 3:
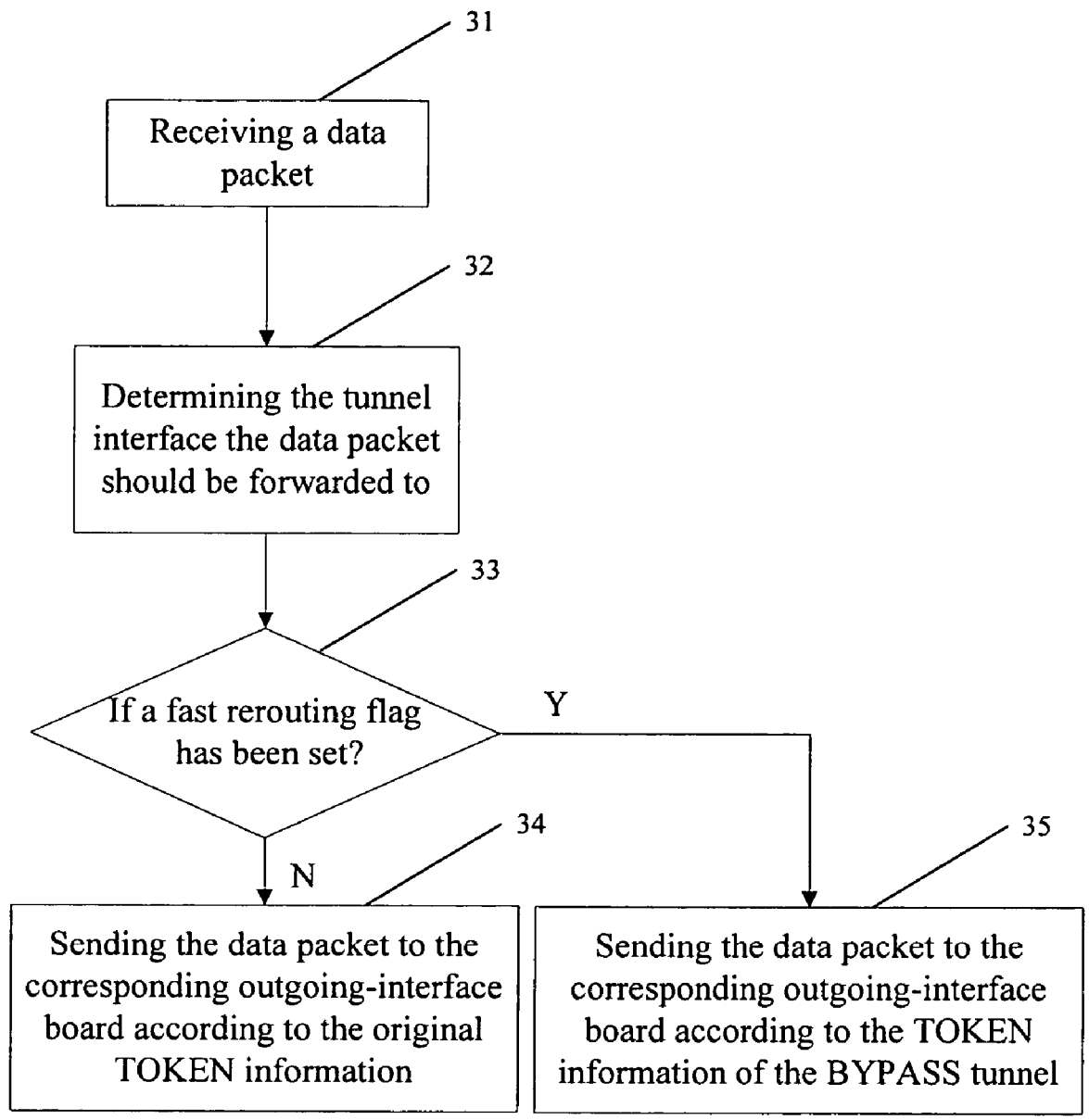
FIG. 3 is illustrating a flow chart of the MPLS forwarding at an ingress node in an embodiment of the invention.

As shown in FIG. 3, the forward procedure of an ingress node includes: in Step 31, the ingress node receives a packet; in Step 32, a tunnel interface which the packet should be sent to is identified, and then the packet is sent to an interface board of the tunnel interface; in Step 33, whether the fast rerouting flag is valid is determined, if it is invalid, in Step 34, a packet is sent to the corresponding outgoing-interface board according to the TOKEN information, where outgoing-label information is pushed in the packet according to the NHLFE information corresponding to the TOKEN information, and then, the packet is sent to a downstream node; otherwise, in Step 35, the packet is sent to an appropriate outgoing-interface board according to the TOKEN information of a bypass path, where outgoing-label information is pushed in the packet according to the NHLFE information corresponding to the TOKEN information of the bypass path, and then the packet is sent to a downstream node.

Figure 4:
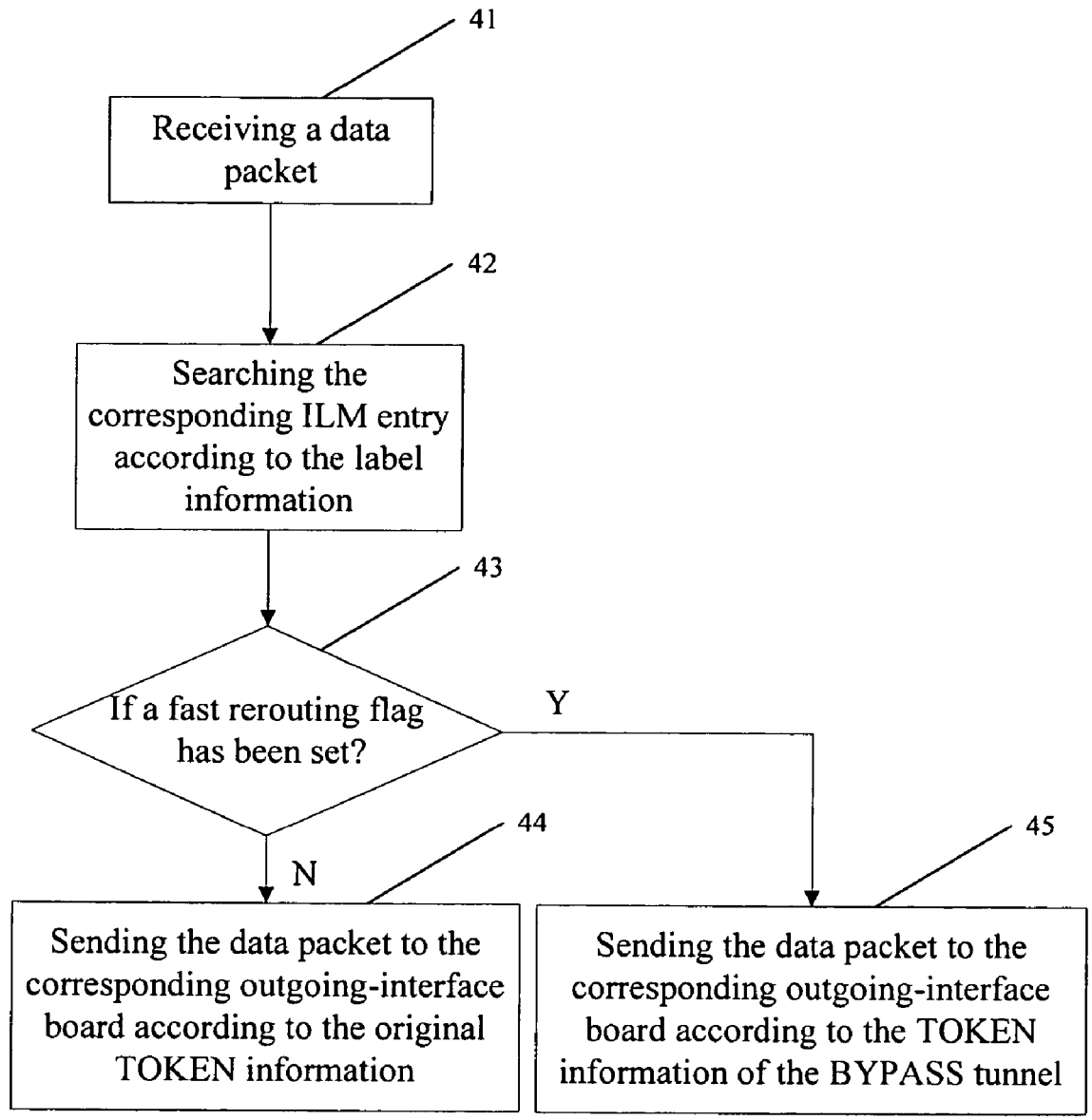
FIG. 4 is illustrating a flow chart of the MPLS forward at a transit node in an embodiment of the invention.

As shown in FIG. 4, the forward procedure of a transit node includes: in Step 41, the transit node receives a packet; in Step 42, the corresponding ILM entry is acquired according to the incoming-label information of the packet; in Step 43, whether the fast rerouting flag in the ILM entry is valid is determined, if it is invalid, in Step 44, the corresponding ILM entry is obtained by using the label of the packet as an index, then the packet is sent to an appropriate outgoing-interface board according to the TOKEN information corresponding to the obtained ILM entry, where the label of the packet is swapped according to the NHLFE information corresponding to the TOKEN information, and then the packet is sent to a downstream node; otherwise, in Step 45, the corresponding ILM entry is obtained by using the label of the packet as an index, the packet is sent to an outgoing-interface board according to the TOKEN information of a bypass path of the obtained ILM entry, where the label of the packet is swapped according to the NHLFE information corresponding to the TOKEN information of the bypass path, and then the packet is sent to a downstream node.

As shown in the above forward procedure, when the network goes wrong, when the packet is on the incoming-interface board, it can be directly known whether the fast rerouting forward is needed, thus the packet can be directly transmitted to the outgoing-interface board where a bypass path is located. In this way, it is not necessary to perform an inter-board transparent transmission required by the procedure of sending the packet to an outgoing-interface board to determine whether the fast rerouting is needed, and thus the transmission efficiency is promoted.

According to some embodiments of the invention, the method for realizing fast rerouting by extending the tunnel interface and the ILM forward information can not only avoid the problem of inter-board transparent transmission introduced by adopting the NHLFE extension to realize fast rerouting, but also accomplish fast rerouting in case that an interface board is plugged out.

Besides, the method for realizing fast rerouting by extending the tunnel interface and the ILM forward information can effectively be combined with the one for accomplishing fast rerouting by extending NHLFE. Therefore, some embodiments of the present invention can integrate the advantages of the two methods to realize a faster flow switch and support fast rerouting in more network failure cases.

Although the invention is described through the embodiments, it is well known among those ordinary skilled in the art that there can be many deviations and changes within the range of the essential of the invention, the protection scope of which is defined in the accompanying claims.

What is claimed is:

1. A method for fast rerouting, wherein, in a router, a fast rerouting flag and bypass path information is set for forward information corresponding to a label switch path of an incoming interface board, the method comprising:

receiving a packet, by an incoming interface of the router, determining whether the fast rerouting flag, set for the forward information corresponding to the packet, is valid;

if the fast rerouting flag is invalid, forwarding the packet according to the forward information corresponding to the packet;

if the fast rerouting flag is valid, forwarding the packet according to the bypass path information set for the forward information which the packet corresponds to;

wherein the fast rerouting flag and the bypass information being set for the forward information corresponding to the label switch path includes, if a forward path has a failure, setting the fast rerouting flag as valid; otherwise, setting the fast rerouting flag as invalid; and wherein the bypass path information is TOKEN information of a bypass path, the TOKEN information of the bypass path being configured to pointing to a next-hop label forward entry information of the bypass path.

2. The method according to claim 1, wherein the failure, which the forward path has, comprises:

an interface failure, link or node failure, or interface board invalidation in the router.

3. The method according to claim 2, wherein, setting the fast rerouting flag as valid if the forward path has a failure comprises:

if the router detects a failure in an interface or a peer router, reporting the failure; and if a link related to the reported failure has a bypass protection function, enquiring a constrain-based routing label switch path corresponding to the link and setting the valid fast rerouting flag and the bypass path information for the forward information corresponding to the constrain-based routing label switch path.

4. The method according to claim 2, wherein, setting the fast rerouting flag as valid if the label switch path has a failure comprises: if an outgoing interface on an interface board has a failure and if a link related to the failure has a bypass protection function, setting, on the outgoing-interface board, the valid fast rerouting flag and the bypass path information for the forward information corresponding to the constrain-based routing label switch path of the link, and setting the valid fast rerouting flag and the bypass path information for the forward information corresponding to the constrain-based routing label switch path of the link on an incoming-interface on the interface board; and forwarding the packet according to a next-hop label forward entry saved on the outgoing-interface board.

5. The method according to claim 2, wherein, setting the fast rerouting flag as valid if the forward path has a failure comprises:

if the router is an ingress node of a constrain-based routing label switch path, setting the fast rerouting flag for the forward information in a tunnel interface as valid, setting TOKEN information of a bypass path as pointing to a next-hop label forward entry information of the bypass path, the bypass path corresponding to the forward information in the tunnel interface; and if the router is a transit node of the constrain-based routing label switch path, setting the fast rerouting flag for the forward information in incoming-label mapping as valid, setting the TOKEN information of a bypass path as pointing to a next-hop label forward entry information of the bypass path, the bypass path corresponding to the forward information in the incoming-label mapping.

6. The method according to claim 5, wherein, forwarding the packet according to the bypass path information set for the forward information which the packet corresponds to, comprises:

determining a next-hop label forward entry information of the bypass path according to the TOKEN information of the bypass path;

sending the packet to the corresponding outgoing-interface board, if the router is an ingress node of the constrain-based routing label switch path, pushing in outgoing-label information according to the next-hop label forward entry information and sending the packet to a downstream node; if the router is a transit node of the constrain-based routing label switch path, swapping the label information according to the next-hop label forward entry information and sending the packet to a downstream node.

7. The method according to claim 5, wherein, forwarding the packet according to the bypass path information set for the forward information which the packet corresponds to, comprises:

if an interface on an interface board has a failure, sending the packet to the corresponding outgoing-interface board according to the original TOKEN information, if the router is an ingress node of the constrain-based routing label switch path, pushing in the outgoing-label information according to the next-hop label forward entry information and sending the packet to a downstream node through the bypass tunnel; and if the router is a transit node of the constrain-based routing label switch path, swapping label information according to the next-hop label forward entry information and sending the packet to a downstream node through the bypass tunnel.

8. The method according to claim 1, wherein, setting the fast rerouting flag as valid if the forward path has a failure comprises:

if the router detects a failure in an interface or a peer router, reporting the failure; and if a link related to the reported failure has a bypass protection function, enquiring a constrain-based routing label switch path corresponding to the link and setting the valid fast rerouting flag and the bypass path information for the forward information corresponding to the constrain-based routing label switch path.

9. The method according to claim 1, wherein, setting the fast rerouting flag as valid if the label switch path has a failure comprises: if an outgoing interface on an interface board has a failure and if a link related to the failure has a bypass protection function, setting, on the outgoing-interface board, the valid fast rerouting flag and the bypass path information for the forward information corresponding to the constrain-based routing label switch path of the link, and setting the valid fast rerouting flag and the bypass path information for the forward information corresponding to the constrain-based routing label switch path of the link on an incoming-interface on the interface board; and forwarding the packet according to a next-hop label forward entry saved on the outgoing-interface board.

10. The method according to claim 1, wherein, setting the fast rerouting flag as valid if the forward path has a failure comprises:

if the router is an ingress node of a constrain-based routing label switch path, setting the fast rerouting flag for the forward information in a tunnel interface as valid, setting TOKEN information of a bypass path as pointing to a next-hop label forward entry information of the bypass path, the bypass path corresponding to the forward information in the tunnel interface; and if the router is a transit node of the constrain-based routing label switch path, setting the fast rerouting flag for the forward information in incoming-label mapping as valid, setting the TOKEN information of a bypass path as pointing to a next-hop label forward entry information of the bypass path, the bypass path corresponding to the forward information in the incoming-label mapping.

11. The method according to claim 10, wherein, forwarding the packet according to the bypass path information set for the forward information which the packet corresponds to, comprises:

determining a next-hop label forward entry information of the bypass path according to the TOKEN information of the bypass path;

sending the packet to the corresponding outgoing-interface board, if the router is an ingress node of the constrain-based routing label switch path, pushing in outgoing-label information according to the next-hop label forward entry information and sending the packet to a downstream node; if the router is a transit node of the constrain-based routing label switch path, swapping the label information according to the next-hop label forward entry information and sending the packet to a downstream node.

12. The method according to claim 10, wherein, forwarding the packet according to the bypass path information set for the forward information which the packet corresponds to, comprises:

if an interface on an interface board has a failure, sending the packet to the corresponding outgoing-interface board according to the original TOKEN information, if the router is an ingress node of the constrain-based routing label switch path, pushing in the outgoing-label information according to the next-hop label forward entry information and sending the packet to a downstream node through the bypass tunnel; and if the router is a transit node of the constrain-based routing label switch path, swapping label information according to the next-hop label forward entry information and sending the packet to a downstream node through the bypass tunnel.

* * * * *